(12) United States Patent
Singh et al.

(10) Patent No.: US 6,376,116 B1
(45) Date of Patent: Apr. 23, 2002

(54) TUBULAR POLYMERIC MEMBRANE FUEL CELL SYSTEM

(75) Inventors: Prabhakar Singh, Ann Arbor; Pam H. Dawson, Dearborn; Vijay K. Garg, Canton, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/570,247

(22) Filed: May 12, 2000

(51) Int. Cl.[7] .............................................. H01M 8/02
(52) U.S. Cl. ............................. 429/31; 429/28; 429/30; 429/35
(58) Field of Search .............................. 429/28, 30, 31, 429/35

(56) References Cited

U.S. PATENT DOCUMENTS

| | | |
|---|---|---|
| 5,336,569 A | 8/1994 | Misawa et al. |
| 5,336,570 A | 8/1994 | Dodge, Jr. |
| 5,595,834 A | 1/1997 | Wilson et al. |
| 5,741,605 A | 4/1998 | Gillett et al. |
| 5,750,281 A | 5/1998 | Washington |
| 5,871,624 A | 2/1999 | Crome |
| 6,060,188 A * | 5/2000 | Muthuswamy et al. ....... 429/31 |

* cited by examiner

Primary Examiner—Gabrielle Brouillette
Assistant Examiner—M. Wills
(74) Attorney, Agent, or Firm—Larry I. Shelton

(57) ABSTRACT

A tubular polymeric membrane fuel cell mechanically integrated through upper and lower manifolds that also acts as power leads to the fuel cell. The fuel cell of the present invention can be stacked and multiple fuel cell stacks can be arranged in a series and parallel format. According to the manifold design of the present invention, the dual-purpose manifolds allow the fuel cell system to operate under low parasitic power loss conditions, thereby simplifying and improving the system. In addition, the mechanically integrated fuel cell structure of the present invention does not require external clamping. The manifold design of the present invention mechanically integrates the fuel cells and the fuel cell stacks without the need for external clamping.

5 Claims, 2 Drawing Sheets

TUBULAR POLYMERIC MEMBRANE FUEL CELL SYSTEM

TECHNICAL FIELD

The present invention relates generally to a tubular polymeric membrane fuel cell system, and more particularly to a tubular fuel cell stack having an integrated manifold.

BACKGROUND OF THE INVENTION

Fuel cell systems offer many advantages over conventional and other power sources. In particular, fuel cell systems are capable of supplying power at remote locations with minimal maintenance. In a fuel cell, electricity is generated electrochemically through the reaction of hydrogen with oxygen. The only reaction emission involved is water vapor, which is essentially harmless to the environment. This is a stark contrast to a conventional power generation system, which releases harmful emissions such as hydrocarbons, carbon monoxide and other chemicals.

A polymeric electrolyte membrane (PEM) fuel cell system has a solid body electrolyte, typically comprised of a synthetic polymeric material. The polymeric material is a solid body that acts as an electrolyte. The advantage of having a solid electrolyte phase is that there are no operational complications caused by the migration of electrolytic material into adjacent regions of the fuel cell. The system is mechanically stable and is capable of operating under a wide variety of operating conditions.

A natural convection fuel cell system is one in which air, or oxygen, is supplied to a cathode by diffusion from the periphery of the fuel cell. In such a natural convection arrangement, there is no requirement for forced convection through the flowfield to replenish depleted oxygen. Natural convection is preferred over other embodiments because it is less complicated than a forced flow arrangement.

PEM fuel cell power generation systems are ideal for land-based stationary and automotive applications due to the high efficiency, low temperature operation, and negligible harmful emissions in the exhaust gas stream. PEM fuel cell devices are typically modular systems and have extremely flexible designs. However, the complexity and the configuration of the fuel cell stack is a concern for manufacturing and for fuel efficiency, in both automotive and stationary applications.

SUMMARY OF THE INVENTION

It is an object of the present invention to provide a polymeric electrolyte membrane (PEM) fuel cell power generation system having reduced power losses and improved reliability. It is another object of the present invention to mechanically integrate a manifold with the fuel cells/fuel cell stacks.

It is a further object of the present invention to provide a manifold that serves as an electrical power lead. It is still a further object of the present invention that the PEM fuel cell system operates under natural convection condition.

In carrying out the above objects and other objects and features of the present invention, a PEM fuel cell system is provided that mechanically integrates a manifold with a fuel cell/fuel cell stack.

The PEM fuel cell engine system of the present invention has a fuel cell stack for the conversion of chemical energy of a fuel gas into electrical energy by an anodic and cathodic electrochemical oxidation/reduction process. The system also has a fuel processor for converting hydrocarbons into a poison free $H_2$ rich gas stream that is suitable for feeding the fuel cells. The system also includes a power conditioning/transfer/control system for transferring power to a system, such as a common household or an automotive drive system. A manifold is mechanically integrated with the fuel cell and provides a power lead to the electrodes in the cell.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
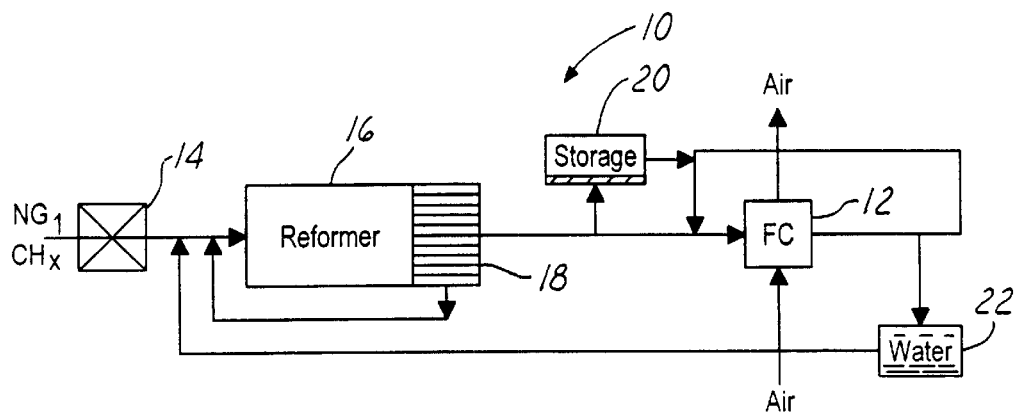
FIG. 1 is a block diagram of a PEM fuel cell system for operation on hydrogen, natural gas or other hydrocarbon fuels.

FIG. 1 depicts, in block diagram form, a PEM fuel cell system 10 which incorporates a fuel cell stack 12 according to the present invention. The fuel cell stack 12 converts the chemical energy of the fuel into electrical energy by anodic and cathodic electrochemical oxidation/reduction. A fuel processor 14 converts hydrocarbons into a poison free $H_2$ rich gas stream that is suitable to feed the fuel cell stack 12. The fuel processor desulpherizes the fuel.

A reformer 16 further provides the input fuel into a gas separation device for the separation of chemical constituents. A membrane separator 18 separates the $H_2$ from the other components in the fuel. The other components, including the remainder of the hydrogen gas, are sent through appropriate piping connected to the fuel cell. The $H_2$ travels to the fuel cell stack 12 where it is converted into electricity that is delivered to the system to be powered or driven. In the present example, the system could be stationary or an automotive drive system. A storage container 20 stores excess $H_2$ and allows the fuel cell stack 12 to use excess $H_2$ on demand. This situation may occur, for example, under transient load condition when the fuel processor is unable to meet the load demand.

In the system 10 shown in FIG. 1, a water storage container 22 captures the wastewater from the fuel cell stack 12 and recycles it through the reformer 16.

Figure 2:
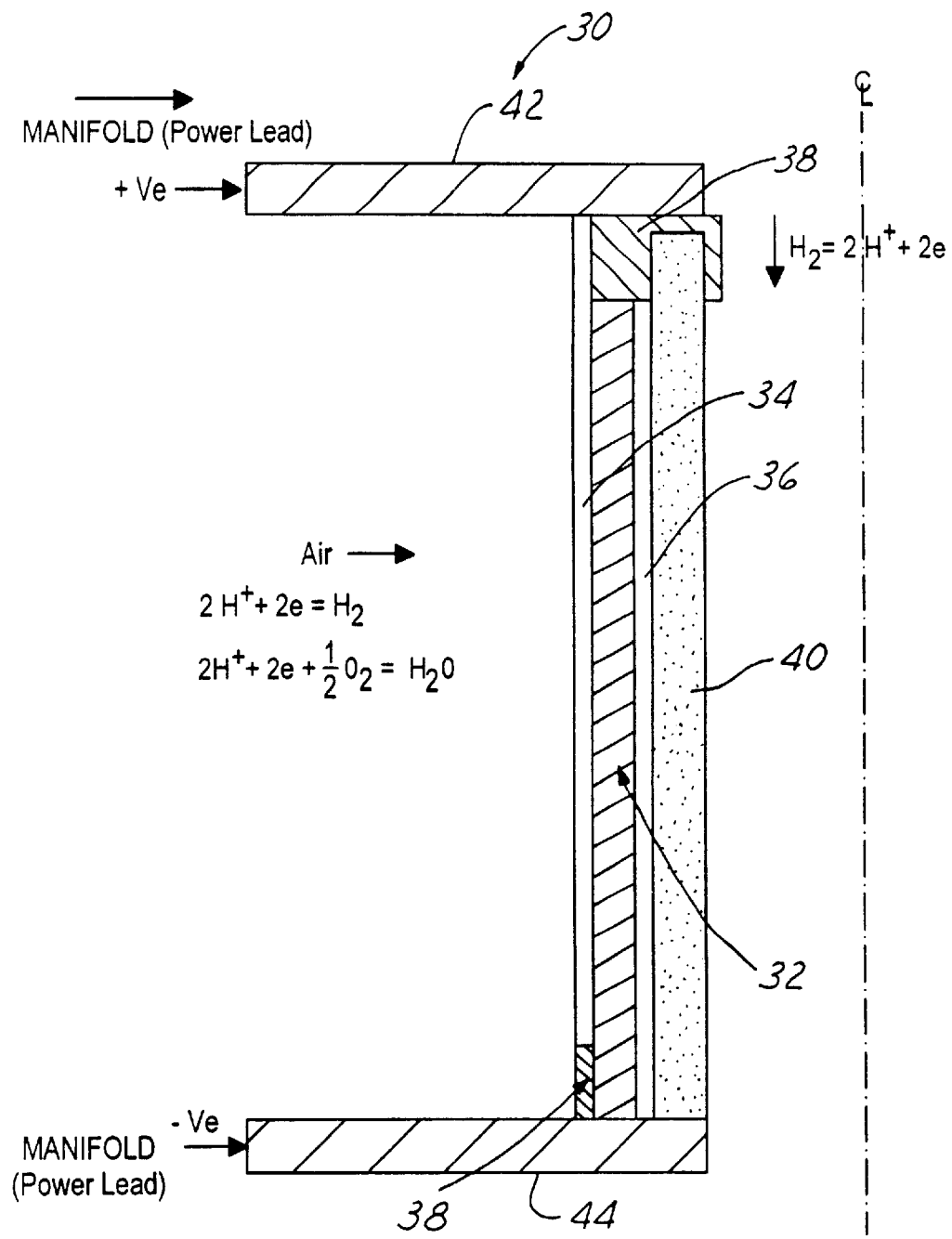
FIG. 2 is a cross-sectional view of a fuel cell tube having integrated manifolds that also operate as electrodes according to the present invention.

FIG. 2 shows a single fuel cell 30 used in the fuel cell stack 12 shown in FIG. 1. Each cell 30 has a polymeric electrolyte membrane 32 between porous electrodes, an anode 34 and a cathode 36. Electrically insulating gaskets 38 separate the two electrodes 34 and 36 insulating them from one another. The insulating gaskets 38 are preferably an electrical insulating material that can withstand the electrical and mechanical requirements of the application.

A porous tube member 40 is located adjacent the cathode 36 to facilitate the diffusion and oxidation of the $H_2$ in each fuel cell 30 and through the fuel cell stack. The porous tube member 40 also supports the electrochemical members of the fuel cell and provides strength and rigidity to the structure. Each fuel cell 30 in the stack contains a porous tube 40.

An upper manifold 42 is provided at one end of the fuel cell and delivers fuel to the electrodes 34, 36 and the porous tube 40. The upper manifold 42 also acts as a power lead, i.e. +ve, for the fuel cell. At the other end of the fuel cell 30, a lower manifold 44 is provided that delivers fuel to the electrodes 32, 34 and porous tube 40. The lower manifold 44 also acts as a power lead, i.e. −ve, for the fuel cell 30.

The upper manifold 42 is integrated by way of a compression fitting or other suitable method. The lower manifold 44 is mechanically integrated with the fuel cell 30 by a brazing or welding process.

The manifolds 42, 44 mechanically integrate the fuel cell tubes 40 and electrodes 34, 36. The integrated design of the fuel cells 30 and the manifolds 42, 44 allow the fuel cell stack to operate under natural convection mode. Manifolds acting as power leads eliminate the need for an external power connection device. Therefore, the need for a high volume air compressor and external power lead is eliminated. The present invention operates much more efficiently than prior art systems that require the compressor and external power. This is because parasitic losses in the air compressor and power leads are eliminated with the present invention.

Another advantage realized with the present invention is fuel cell 30 structure that is resistant to vibration fatigue. Under automotive driving conditions, vibrations are introduced which degrade system components over a period of time. The fuel cell of the present invention has integrated manifolds, electrodes, tubes making the fuel cell 30 of the present invention resistant to vibration fatigue.

Additionally, the fuel cell stack is integrated through the manifold design. Therefore, external clamping of fuel cells is not required. The fuel cell stack according to the present invention is not only more rugged, but simplified over prior art arrangements that require external clamping.

Figure 3:
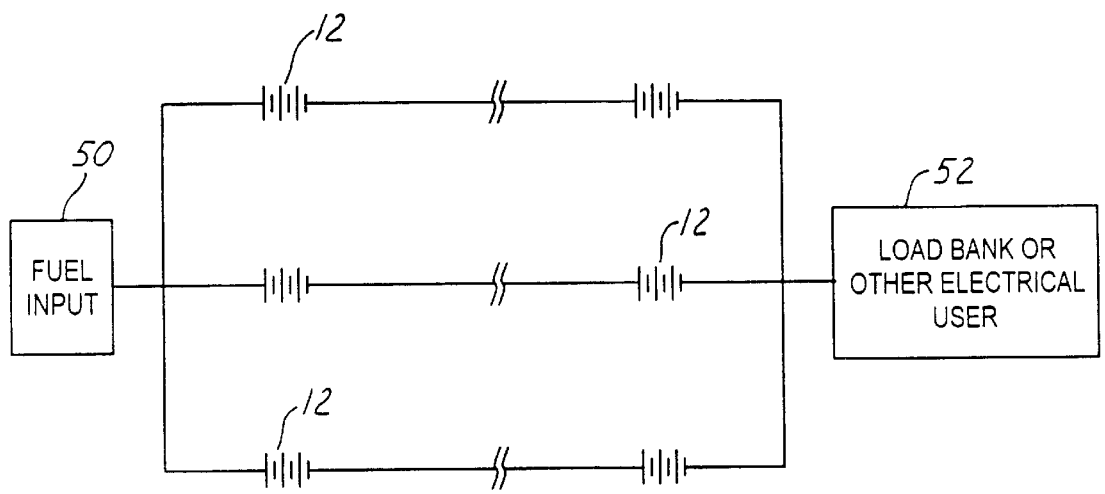
FIG. 3 is a schematic of a plurality of fuel cell stacks arranged in a series and parallel configuration to attain desired current and voltage.

Incorporating the fuel cell 30 of the present invention allows a plurality of fuel cell stacks 12 to be connected in series and parallel combination to obtain a desired voltage and current requirement. FIG. 3 is an example of a plurality of fuel cell stacks 12 arranged in a series and parallel combination. The fuel input 50 feeds the cell stacks 12 and the cell stacks 12 provide output 52.

The fuel cell system according to the present invention reduces power losses and provides a reliable fuel system. It is estimated that 8 to 10 kW will be produced for fuel cell unit/cu. ft. An example of the power generated by a fuel cell having a size of 1 cu. ft. is as follows:

Tube diameter: 0.125"

Tube length: 12"

Footprint of package space: 12"×12"

Tube spacing: 0.125"

Number of tubes/sq. ft.: 30

Active surface area of tubes: 0.03 sq. ft.

A conservative estimate would be cells operating at 278 W/sq. ft. and the power generated by a thirty (30) fuel cell system is 19 kW. It should be noted that while the present example is for an 8–10 kW example having a foot print of 12"×12", the fuel cell of the present invention may be used for any size application.

The invention covers all alternatives, modifications, and equivalents, as may be included within the spirit and scope of the appended claims.

What is claimed is:

1. A fuel cell having a tubular structure, said fuel cell comprising an anode;

a cathode;

an electrolytic membrane disposed between said anode and said cathode;

a porous tube member in contact with said cathode;

a first insulating gasket located at a first end of said fuel cell for separating said anode and said cathode;

a second insulating gasket located at a second end of said fuel cell for separating said anode and said cathode;

an upper manifold captively retaining and providing a passageway for fuel and electric power to said anode, said cathode and said porous tube member at said first end of said fuel cell;

a lower manifold captively retaining and providing a passageway for fuel and electric power to said anode, said cathode and said porous tube member at said second end of said fuel cell.

2. The fuel cell as set forth in claim 1 wherein said upper manifold and said lower manifold are integrated with said anode, cathode and porous tube member.

3. A fuel cell assembly comprising a plurality of fuel cells integrated to each other, each fuel cell in said plurality of fuel cells further comprising:

an anode;

a cathode;

an electrolytic membrane disposed between said anode and said cathode;

a porous tube member in contact with said cathode;

a first insulating gasket located at a first end of said fuel cell for separating said anode and said cathode;

a second insulating gasket located a second end of said fuel cell for separating said anode and said cathode; and an upper manifold captively retaining and providing a passageway for fuel and electric power to said anode, said cathode and said porous tube member at said first end of each of said fuel cells in said plurality of fuel cells;

a lower manifold captively retaining and providing a passageway for fuel and electric power to said anode, said cathode and said porous tube member at said second end of each of said fuel cells in said plurality of fuel cells;

wherein said upper and lower manifold mechanically integrates each of said fuel cells in said plurality of fuel cells to create a fuel cell stack.

4. The assembly as claimed in claim 3 further comprising a plurality of fuel cell stacks are arranged in a predetermined pattern and mechanically integrated through upper and lower manifolds.

5. The fuel cell assembly as claimed in claim 4 wherein said predetermined pattern is a plurality of fuel cell stacks arranged in series and parallel.

* * * * *